(12) United States Patent
Strauss (10) Patent No.: US 7,642,672 B2
(45) Date of Patent: Jan. 5, 2010

(54) CONTROL OF INTEGRATED SUPPLY VOLTAGE REGULATION DUE TO ON-CHIP INTERNAL RESISTANCE FLUCTUATIONS IN INTEGRATED CIRCUITS

(75) Inventor: Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 524 days.

(21) Appl. No.: 10/816,877

(22) Filed: Apr. 5, 2004

(65) Prior Publication Data
US 2005/0218725 A1    Oct. 6, 2005

(51) Int. Cl.
*H02J 1/00* (2006.01)
(52) U.S. Cl. ............................................. 307/82
(58) Field of Classification Search ............. 307/82
See application file for complete search history.

(56) References Cited

U.S. PATENT DOCUMENTS 5,771,240 A * 6/1998 Tobin et al. ................ 714/724

6,525,434 B2 * 2/2003 Brodeur ..................... 307/39

* cited by examiner

*Primary Examiner*—Fritz M Fleming
*Assistant Examiner*—Dru M Parries
(74) *Attorney, Agent, or Firm*—Mendelsohn, Drucker & Associates, P.C.; Yuri Gruzdkov; Steve Mendelsohn (57) ABSTRACT

The effects of power supply resistance and internal resistance drop are measured at any time in the interior or other strategic areas of an IC device during steady-state operation, and the results of managed internal voltage regulation are fed back from at least one point, but preferably from several or more points throughout the power grid of the IC. Thus, stability of voltage regulation on an IC including at least one integrated voltage regulator is dynamically controlled with voltage regulation that is managed to effectively provide a 'secondary' voltage regulation of the output of one or more voltage regulators to provide a desired voltage output result on one or more portions of a power grid. The management may be implemented in an IC having a singular power grid with respect to a particular supply voltage, or in an IC having multiple power grid structures (e.g., one in each quadrant, etc.).

20 Claims, 5 Drawing Sheets

CONTROL OF INTEGRATED SUPPLY VOLTAGE REGULATION DUE TO ON-CHIP INTERNAL RESISTANCE FLUCTUATIONS IN INTEGRATED CIRCUITS

BACKGROUND OF THE INVENTION

1. Field of the Invention

This invention relates to architecture of integrated circuits. More particularly, it relates to methods for providing uniform power distributions internally to large integrated circuit (IC) designs.

2. Background of Related Art

Integrated circuits (ICs) are a fact of life that has transformed society over decades of continued development and miniaturization.

While initially many ICs operated with an input 5 volt power source, more recent technology advances have developed low voltage technologies that utilize lower voltage power supply input, e.g., 3.3 volt, 2.5 volt, 1.5 volt, etc.

Figure 4:
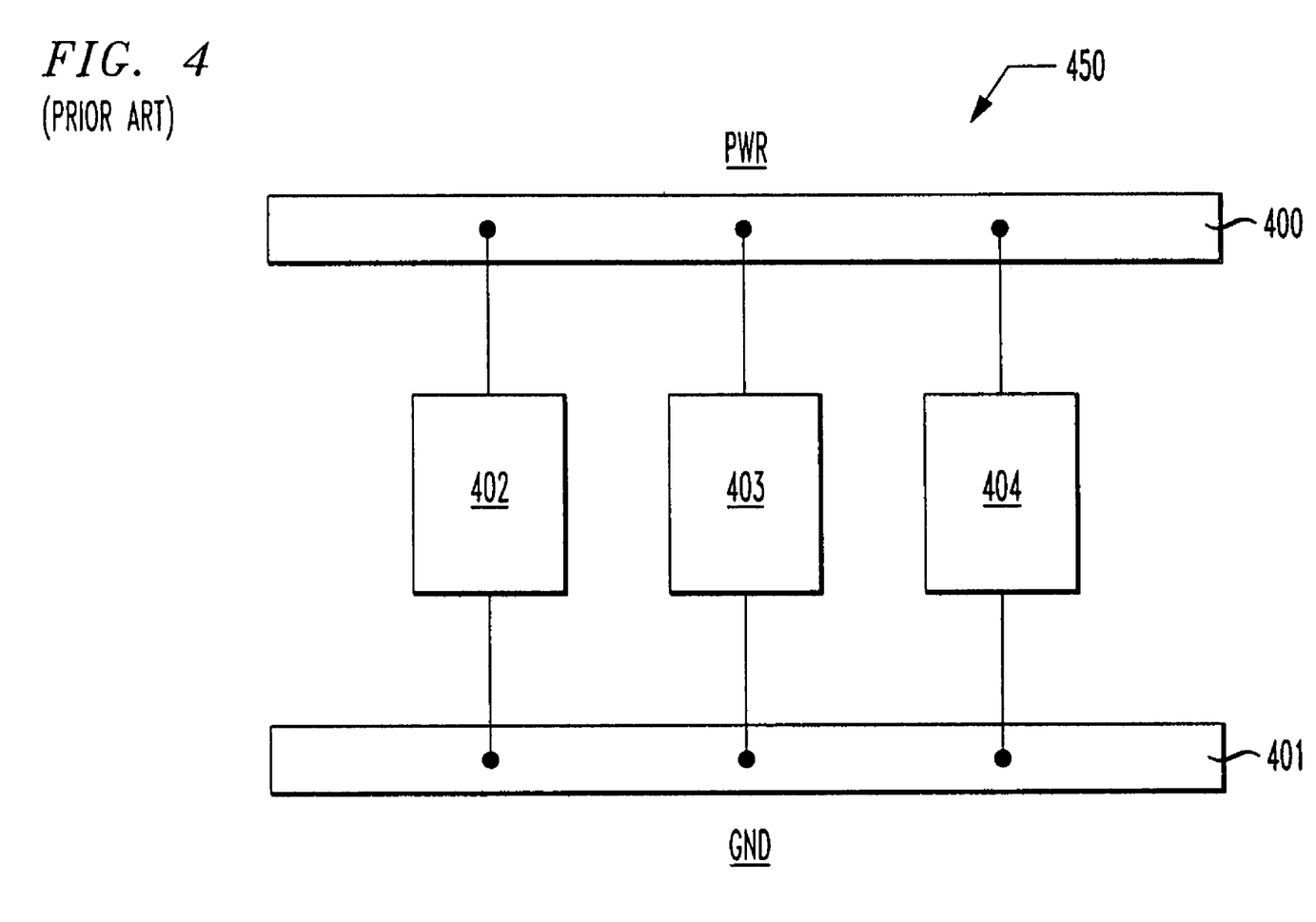
FIG. 4 shows a conventional architecture for powering various elements of an integrated circuit.

For instance, FIG. 4 shows a conventional architecture for powering various elements of an IC 450 from power rails 400 & 401. Powered sub-circuit elements 402-404 of a typical integrated circuit may contain digital components (e.g., custom cell/logic gates, memory, etc.), analog sub-circuits (e.g., NTSC video decoder logic, analog audio logic, etc.), and/or circuits with a mix of analog and digital (e.g., audio CODECs).

Until very recently, voltage regulation was most often performed external to a given IC. Voltage regulation 'regulates' or controls a general power supply input to a lower, more stable voltage level.

Due largely to trends to increase the number of functions in a given IC, more and more devices which were otherwise connected in an electrical circuit board including the IC have been integrated into the given IC. This is done for miniaturization (space/form factor) as well as cost sensitivity considerations. In some instances, an IC has been developed that implemented a voltage regulator within an IC.

The internally implemented voltage regulation element in the conventional IC takes in an external voltage, regulates this external voltage by setting an output threshold/voltage, and distributes this throughout a power rail that is routed as necessary around the entire IC.

Figure 5:
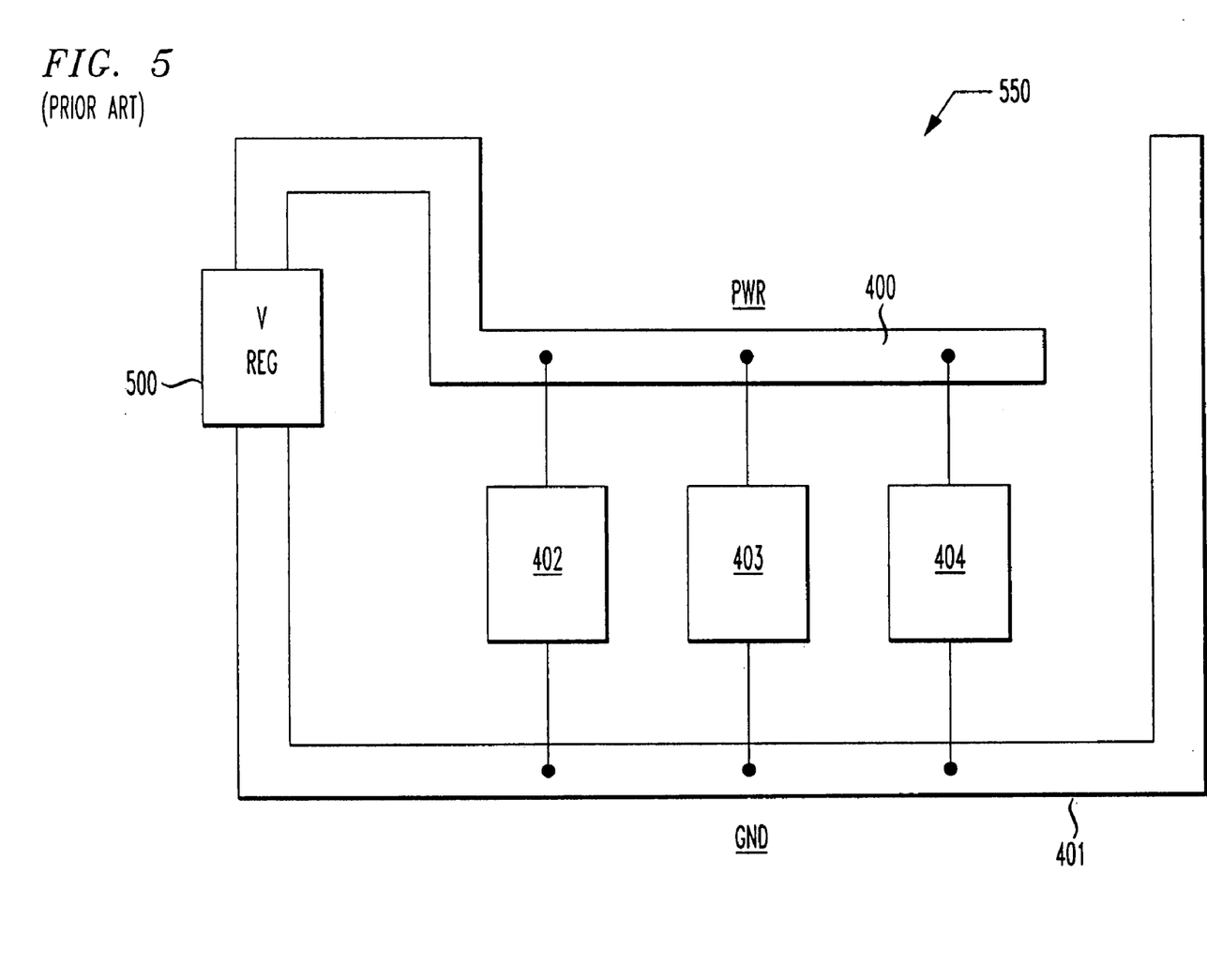
FIG. 5 shows another conventional architecture for power various sections or elements of an integrated circuit.

For instance, FIG. 5 shows another conventional architecture for power various sections or elements of an integrated circuit 550. As shown in FIG. 5, various elements 402-404 of a given IC 550 are powered between a power rail 400 that extends as necessary about the IC 550, and a ground rail 401 which similarly is routed as necessary about the IC 550, with the added integration of a voltage regulator 500 appropriate for the particular application.

ICs are increasingly getting bigger-not necessarily in physical package size but in the sense that they are including greater numbers of functions, features, etc. Thus, while miniaturization continues to progress over time, ICs are similarly progressing and are including greater numbers of functional circuit elements.

Given the conventional power rail approach, it is recognized by the inventor of the present application that internal power distribution may not be uniform. This is depending in large part both on the ever-increasing component density of the IC device 550, as well as on where in particular the voltage regulating element is physically located within the IC structure 550. Thus, if power is introduced by the voltage regulator 500 as shown in FIG. 5, the present inventor appreciates that the regulated voltage will be somewhat higher for the first element 402 powered by the power rail 400 of the IC than for the last element 404 powered by the power rail 400. While the voltage drop along a power rail within an IC may not pose a problem to designers for analog circuits or in "small" digital chip developments, it will become increasingly problematic as ICs become denser, larger in physical structure, and/or when additional functionality with un-bounded duty cycles become prevalent. Moreover, as the voltage level of power supplies lowers (e.g., to 3.3 v, 2.5 v, 1.5v, etc.), non-uniformity in voltage along the power supply rail will become more significant.

Thus, the present inventor appreciates that there is a need for improved voltage distribution and/or power management architecture and techniques.

SUMMARY OF THE INVENTION

In accordance with the principles of the present invention, a power management architecture in an integrated circuit comprises a power rail to supply power to a plurality of sections of the integrated circuit. A voltage meter measures a level of voltage supplied to each of at least two of the plurality of sections. A first integrated voltage regulator supplies power to the power rail. An output voltage of the first integrated voltage regulator is controlled based on a voltage level measured at each of the plurality of sections.

A power management architecture in an integrated circuit in accordance with another aspect of the present invention comprises a plurality of power rails to supply power to a respective plurality of sections of the integrated circuit. A voltage meter measures a level of voltage supplied to each of at least two of the plurality of sections. A plurality of integrated voltage regulators each supply power to a respective one of the plurality of power rails. An output voltage of each of the plurality of integrated voltage regulators is controlled based on a respective voltage level measured at each of the plurality of sections.

A method of providing secondary internal voltage regulation in an integrated circuit including internal voltage regulation in accordance with yet another aspect of the invention comprises providing at least one power rail to supply power to a plurality of sections of the integrated circuit. A level of voltage supplied to each of at least two of the plurality of sections is measured. A voltage level of power supplied to the power rail is regulated based on a voltage level measured at a supply point to at least one of the plurality of sections of the integrated circuit.

Another method of providing secondary internal voltage regulation in an integrated circuit including internal voltage regulation comprises providing a plurality of power rails to supply power to a respective plurality of sections of the integrated circuit. A level of voltage supplied to each of at least two of the plurality of sections is measured. A voltage output from a plurality of integrated voltage regulators is regulated. Each of the plurality of integrated voltage regulators supplies power to a respective one of the plurality of power rails.

BRIEF DESCRIPTION OF THE DRAWINGS

Features and advantages of the present invention will become apparent to those skilled in the art from the following description with reference to the drawings, in which.

DETAILED DESCRIPTION OF THE ILLUSTRATIVE EMBODIMENTS

The present invention provides an architecture and technique for improved control and secondary regulation of internal voltage regulation elements in integrated circuits. The disclosed architecture is particularly responsive to prevent or best accommodate voltage fluctuations due to on-chip internal resistance (IR) drops across internal power (PWR or VDD) and/or ground (GND or VSS) power planes.

Integrated circuits are constantly migrating toward smaller geometries while at the same time becoming more complex and physically more inclusive, given the further desire to integrate additional functionality within a system on a given device. Further, this trend toward smaller geometries is placing additional requirements on device supply voltage and current requirements which, depending upon the particular application, require the addition of an integrated voltage regulator. Given the relative size and inclusive nature of these devices, and further assuming large IC designs/geometries, it has been appreciated by the inventor herein that it is becoming difficult to adequately supply stable power supply (VDD) and ground (VSS) to the interior of the chip due to the resistance in the metal.

The invention provides a method and technique for providing uniform power distributions internally to large integrated circuit designs. Through the use of feedback provided by voltage measurement at particular points throughout the IC (e.g., relating to quadrants or other portioned sections of the IC, based on current draw of a particular element or function, etc.), the ability to control and intelligently modify the characteristics of a regulation element or elements within an IC is greatly improved.

The present invention provides an ability to measure the effect of power supply resistance and internal resistance drop at any time in the interior or other strategic areas of an IC device during steady-state operation, coupled with feedback of the results of controlled voltage regulation at several points throughout the power grid of the IC. Thus, stability of voltage regulation on an IC including at least one integrated voltage regulator is dynamically controlled or managed.

In accordance with the principles of the present invention, internal voltage regulation by way of one or more internal voltage regulators are actively controlled using a measurement feedback loop to effectively provide a 'secondary' internal voltage regulation of the voltage level provided to each particular area, function, quadrant, separate power grid, etc.

The disclosed voltage regulation management may be implemented in an IC having a singular power rail with respect to a particular supply voltage, or in an IC having multiple separate power rail structures (e.g., an electrically separate power rail in each quadrant of an IC, one in each half, one for each function, etc.)

Based on the use of a feedback path, the resultant output voltage to a power rail may be regulated to a defined level. When distributed across a large IC, this voltage-sensing scheme allows "access" to any point within the IC and allows measurement of power supply potential (e.g., VDD), ground potential (e.g., VSS), and/or instantaneous current consumption within that "section" at any point within the circuit.

In another embodiment this feedback path, an intelligent power management state machine may be implemented. Based on a measurement of internal resistance voltage drop within a given section, region, element, etc. of the IC, the power management state machine may control the switching in or out of additional supply/regulation elements for the purposes of distributing power more uniformly across various subsections of the large IC. This could be done to minimize the known affects of potentially harmful "hot spots" within a given IC. In some cases, the use of a power management state machine or controller can be leveraged to better control various sections, regions, elements, etc. of the IC for power management and efficiency purposes.

Figure 1:
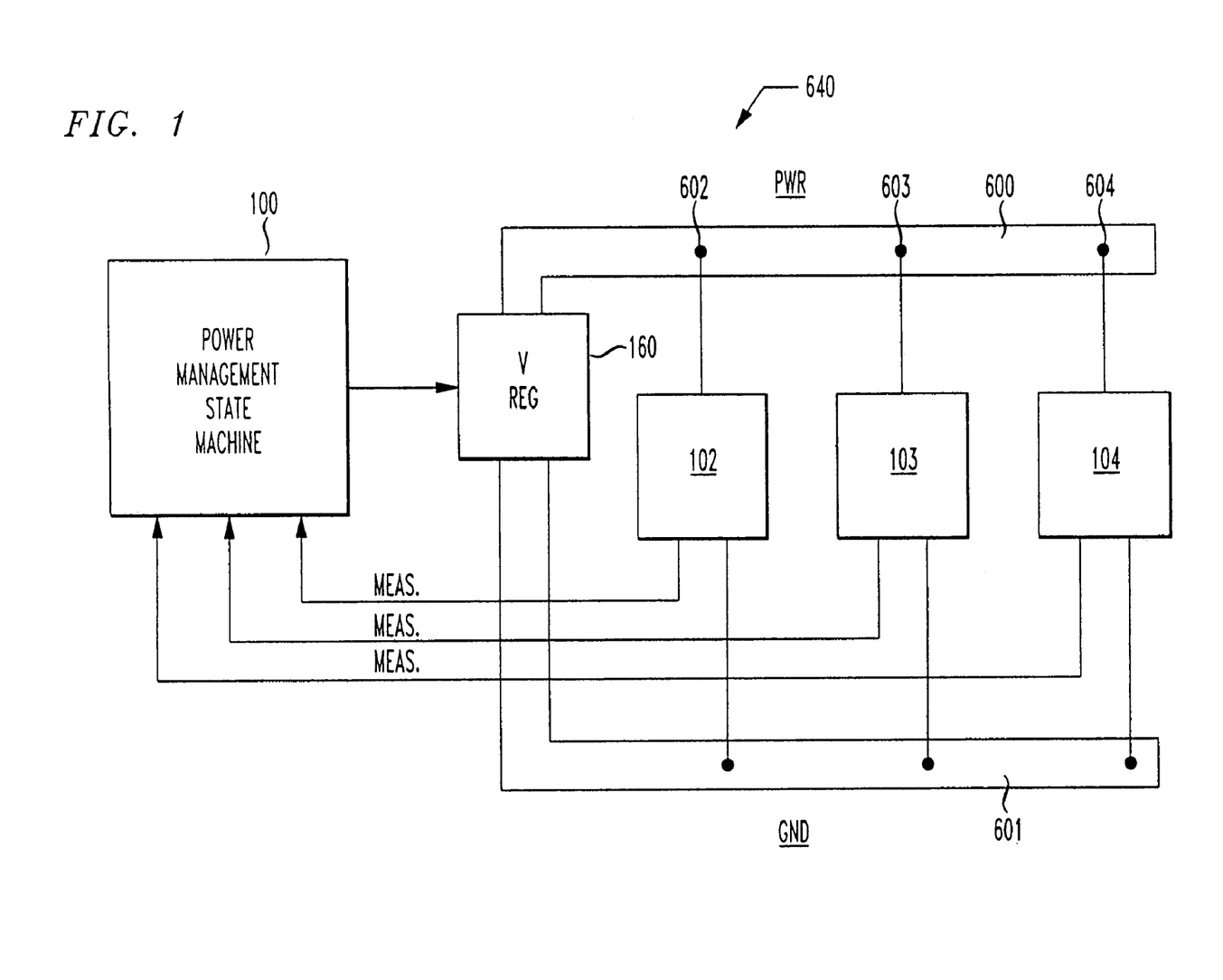
FIG. 1 shows a power management architecture providing feedback and voltage control for an integrated circuit in accordance with a first embodiment of the present invention.

FIG. 1 shows a power management architecture providing feedback and voltage control for an integrated circuit 640 in accordance with a first embodiment of the present invention.

In particular, as shown in FIG. 1, an integrated circuit 640 comprises a power management state machine 100, which controls an internal integrated voltage regulation element 160. The voltage regulation element 160 provides supply power to a power rail 600 and a matching power ground 601. The power rail 600 and power ground 601 are used to provide power to multiple regions 102-104 of the IC 640.

Figure 2:
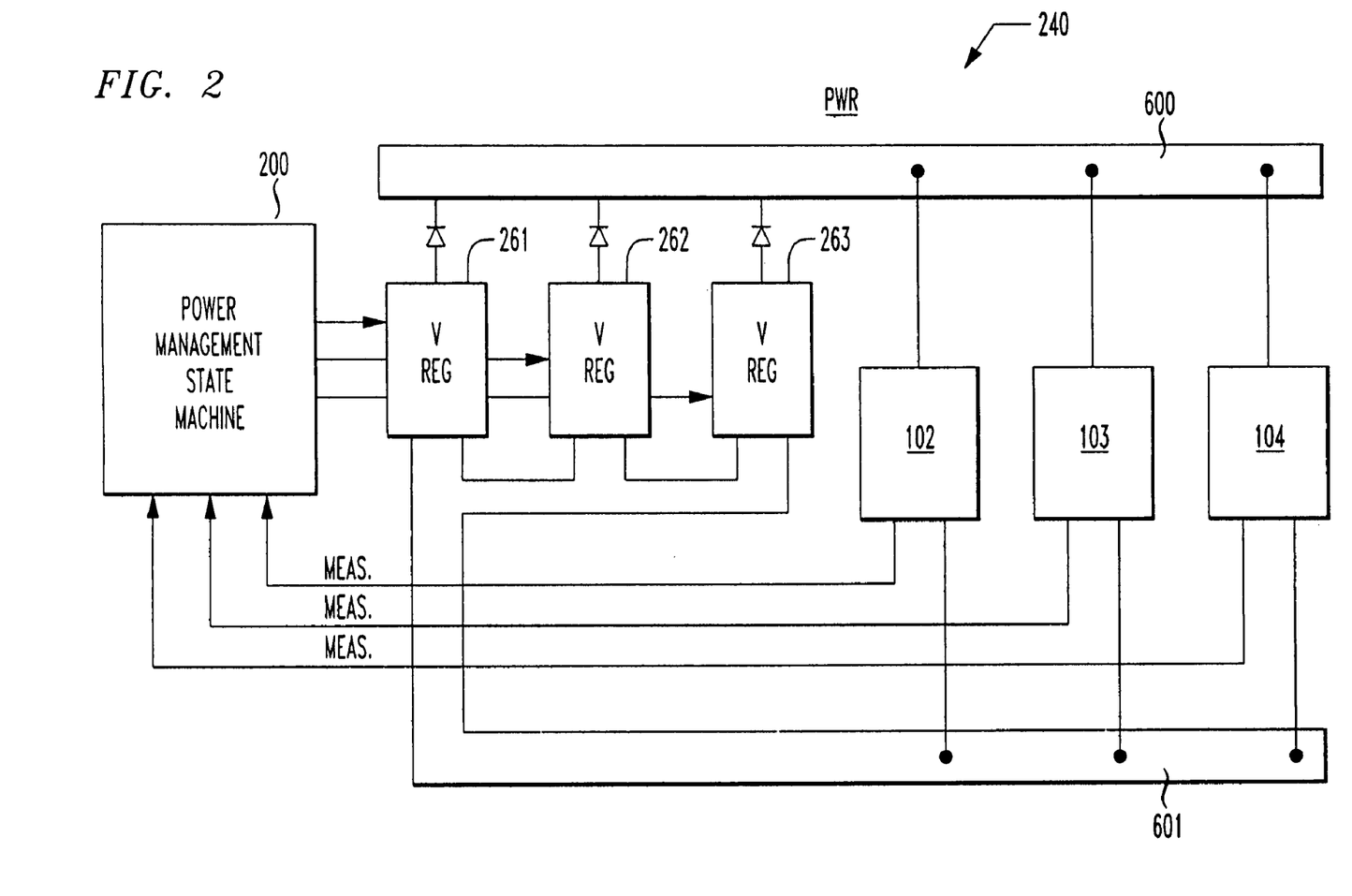
FIG. 2 shows another power management architecture providing feedback and voltage control for an integrated circuit in accordance with another embodiment of the present invention.
Figure 3:
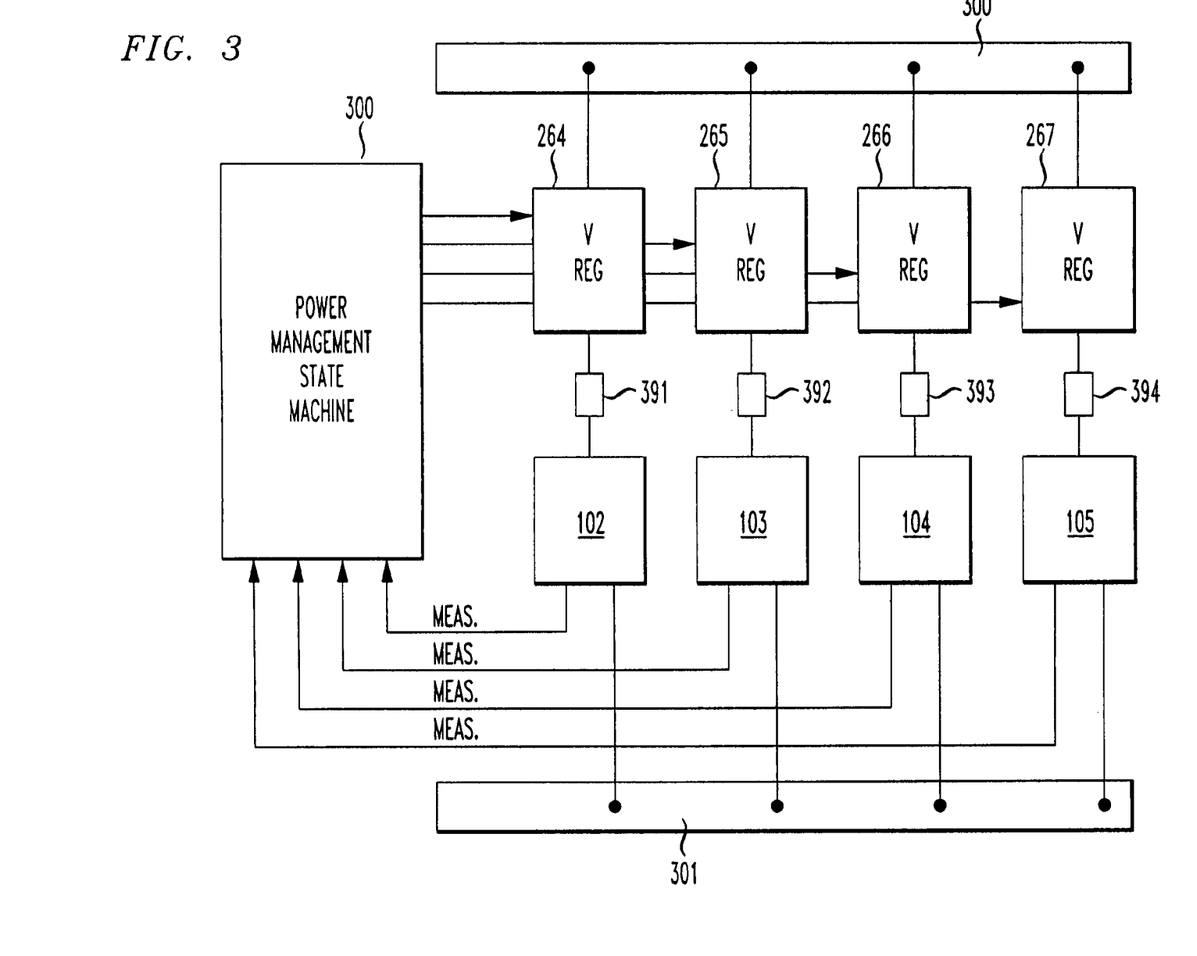
FIG. 3 shows yet another power management architecture providing feedback and voltage control for an integrated circuit in accordance with yet another embodiment of the present invention.

The powered modules 102-104 in FIGS. 1-3 are depicted as being physical regions of the IC, the modules 102-104 can alternatively represent respective individual functions or elements integrated within the IC 640.

The power management state machine 100 provides control to a voltage regulator 160, and receives multiple feedback measurements of the voltage output from the voltage regulator 160. The power management state machine 100 may be comprised of a simple logic function, or may be a processor. Preferably, but not necessarily, the power management state machine 100 is integrated with the integrated circuit 640.

The voltage regulation element 160 may be as complex as a solid state voltage regulator, or as simple as a current source. The voltage regulation element 160 drives a single power rail 400 to a single ground rail 401. The power rail 400 and power ground 401 are appropriately routed about the IC 640 and provide power to multiple areas, functions or modules 102-104.

Importantly, the voltage level from at least one point along the power rail 600 is measured, and fed back as input to the power management state machine 100. The power management state machine 100 controls the voltage output of the voltage regulation element 160 to achieve a desired voltage level at the point that is measured. In FIG. 1, the voltage levels powering each of three separate regions 102, 103 and 104 are measured, and fed back to the power management state machine.

In a preferred embodiment, the voltage regulator 160 will increase the output of the voltage regulator to exceed a design voltage threshold at each of the points of measurement. Alternatively, a best fit model may utilize a control method that seeks to minimize, below a given level, a square of a difference in voltage between a desired voltage level and an actual voltage level. In any event, a desired voltage level is preferably maintained at the power supply point 602-604 to each region 102, 103 and 104.

Ideally, the measurement of the voltage level at the power supply points 602-604 will be taken as close as possible to that particular physical point 602-604. Of course, in reality, the voltage level may be measured at a point farther on, e.g., within the region or element 102-104.

Any suitable circuit to measure voltage to a desired accuracy and precision may be implemented. For instance, the voltage at the supply point 602-604 to any particular region 102-104 may be measured as simply as with a voltage measured across a small resistor in series with the power to the region 102-104. Ideally, the voltage level is measured and converted into digital form, then passed on to the power management state machine 100 over an appropriate digital bus. This avoids the affects of any additional voltage drops incurred in the voltage measurement feedback paths back to the power management state machine 100.

FIG. 2 shows another power management architecture providing feedback and voltage control for an integrated circuit in accordance with another embodiment of the present invention.

In particular, as shown in FIG. 2, multiple voltage regulation elements 261-263 are integrated within an IC 240. All voltage regulation elements 261-263 provide voltage supply power to a singular power rail 600, e.g., through a respective diode.

In this embodiment, the power management state machine 200 continues to receive voltage level measurements from the power supply point to several regions or elements 102-104. To control the voltage level at each measured region 102-104 to be above a desired threshold level, additional voltage regulation elements 262, 263 are turned on and/or increased in voltage output level as necessary to augment a supply of power to the power rail.

In a simplest implementation of the architecture shown in FIG. 2, each voltage regulation element 261-263 is merely turned on or off as necessary to maintain a given voltage level at each point of measurement. In a more sophisticated embodiment, the voltage level output from each of the voltage regulation elements 261-263 may be actively adjusted as necessary.

FIG. 3 shows yet another power management architecture providing feedback and voltage control for an integrated circuit in accordance with yet another embodiment of the present invention.

In particular, as shown in FIG. 3, a voltage regulation element 264-267 is integrated for each region, module, function 102-105, in effect creating a plurality of power rails 391-394. In this disclosed embodiment, control to any given voltage regulation element 264-267 is directly related to the fed back voltage level measurement provided by the relevant supplied region, module, function, etc. 102-105.

The integrated circuit architectural design techniques disclosed herein may be implemented in a simple custom cell structure. For example, in one simple custom cell design a small resistor may be included between a particular region, element, etc. of an IC and its power rail, and another small resistor may be included between the particular region or element and the ground rail. A standard multiplexer (MUX) function may be implemented to allow selection between these two resistive connections to VDD or VSS. The output of the MUX is then routed as a signal (be it digital or analog) to create a feedback path to the voltage regulation element for that given section or plane of the IC.

In a further embodiment, these various feedback path/resultant output power measurements may be buffered and routed to an external pin of the IC, thus enabling an external mechanism to internally view or sample various internal portions of the power grid of a particular IC, either during a design/debug phase of the IC and/or during a manufacture/production of the IC. During manufacture, regions or elements of the IC that appear shorted or otherwise exceeding an expected power draw may be easily identified and isolated.

The present invention poses numerous advantages over conventional techniques. For instance, the present invention can be implemented in a fairly straight forward manner into existing IC designs by offering regulation elements that can be controlled via feedback from various parts of the IC. Accordingly, a constant, stable power source may be integrally provided, independent of increased electrical draw due to an amount of circuit activity as measured by a drop in internal resistance in a given section of the IC.

As an example of an IC that would benefit from the present invention, a largely integrated IC semiconductor chip might have multiple embedded functions including a communications engine such as WiFi. In over 80% of current applications, the WiFi engine is likely to operate in an ultra-low power-down mode, and consume little power. However, for such an application, when fully functional and transmitting, appreciable current would be drawn and be accounted for within the power budget of the given IC. The analog circuitry in such a device, particularly if it's a low voltage device operating from a power supply of 3.3 volts or less, might be sensitive to drops in voltage on the power rail as the various functions and elements of the IC are powered up (e.g., in a transmitting mode). Use of power management in accordance with the principles of the present invention can minimize such sensitivities.

The present invention is simple to implement during the design phase of a particular IC device, has applicability to any IC development, particularly larger ICs or circuits, and also simple to use in a measurement phase.

While the invention has been described with reference to the exemplary embodiments thereof, those skilled in the art will be able to make various modifications to the described embodiments of the invention without departing from the true spirit and scope of the invention.

What is claimed is:

1. An integrated circuit, comprising:
first and second power rails;
a first voltage regulator coupled to electrically bias the first power rail with respect to the second power rail;
a plurality of circuit modules, each coupled between the first and second power rails to draw power therefrom;
a plurality of voltage meters, each coupled to measure a voltage level received from the first power rail by a respective one of the circuit modules, wherein a voltage output of the first voltage regulator applied to the first power rail is controlled based on the voltage levels measured by the voltage meters so that each of circuit modules receives a respective desired voltage level from the first power rail; and
at least a second voltage regulator coupled to electrically bias the first power rail with respect to the second power rail, wherein a voltage output of the second voltage regulator applied to the first power rail is controlled based on the voltage levels measured by the voltage meters so that each of the circuit modules receives the respective desired voltage level from the first power rail.

2. The integrated circuit of claim 1, wherein the voltage levels received from the first power rail by at least two of the circuit modules differ due to a voltage drop along the first power rail.

3. The integrated circuit of claim 1, further comprising a power manager operatively coupled to the first voltage regulator and to the two or more voltage meters, wherein the power manager is adapted to:
receive voltage-level measurements from the two or more voltage meters; and
control the voltage output of the first voltage regulator based on the voltage-level measurements.

4. The integrated circuit of claim 3, wherein the voltage-level measurements are received in digital form over a digital bus.

5. The integrated circuit of claim 1, wherein the voltage output of the first voltage regulator is controlled so that, for each of the circuit modules, the voltage level received from the first power rail exceeds a design-voltage threshold.

6. The integrated circuit of claim 1, wherein the voltage output of the first voltage regulator is controlled to minimize, for each of the circuit modules, a square of a difference between the voltage level received from the first power rail and a desired voltage level.

7. The integrated circuit of claim 1, further comprising:
a first diode coupled between the first voltage regulator and the first power rail; and
a second diode coupled between the second voltage regulator and the first power rail, wherein:
the voltage output of the first voltage regulator is applied to the first power rail through the first diode; and
the voltage output of the second voltage regulator is applied to the first power rail through the second diode.

8. The integrated circuit of claim 1, wherein the second voltage regulator is turned on and off to maintain the respective desired voltage levels for the plurality of circuit modules.

9. The integrated circuit of claim 1, further comprising a pin to which the voltage levels measured by the voltage meters are routed to enable external sampling of the voltage levels received by the circuit modules from the first power rail.

10. A method of supplying power to an integrated circuit, the method comprising:
electrically biasing a first power rail of the integrated circuit with respect to a second power rail of the integrated circuit using a first voltage regulator, wherein the integrated circuit comprises a plurality of circuit modules, each coupled between the first and second power rails to draw power therefrom;
for each of the circuit modules, measuring a voltage level received by the circuit module from the first power rail;
controlling a voltage output of the first voltage regulator applied to the first power rail based on the measured voltage levels so that each of the circuit modules receives a respective desired voltage level from the first power rail, wherein:
the integrated circuit further comprises at least a second voltage regulator coupled to electrically bias the first power rail with respect to the second power rail; and
the method further comprises controlling a voltage output of the second voltage regulator applied to the first power rail based on the measured voltage levels so that each of the circuit modules receives the respective desired voltage level from the first power rail.

11. The method of claim 10, wherein the voltage levels received from the first power rail by at least two of the circuit modules differ due to a voltage drop along the first power rail.

12. The method of claim 10, wherein the integrated circuit further comprises a power manager operatively coupled to the first voltage regulator and to the two or more voltage meters, wherein the power manager is adapted to:
receive voltage-level measurements from the two or more voltage meters; and
control the voltage output of the first voltage regulator based on the voltage-level measurements.

13. The method of claim 12, wherein the voltage-level measurements are received in digital form over a digital bus.

14. The method of claim 10, wherein the voltage output of the first voltage regulator is controlled so that, for each of the circuit modules, the voltage level received from the first power rail exceeds a design-voltage threshold.

15. The method of claim 10, wherein the voltage output of the first voltage regulator is controlled to minimize, for each of the circuit modules, a square of a difference between the voltage level received from the first power rail and a desired voltage level.

16. The method of claim 10, wherein:
the integrated circuit further comprises:
a first diode coupled between the first voltage regulator and the first power rail; and
a second diode coupled between the second voltage regulator and the first power rail; and
the method further comprises:
applying the voltage output of the first voltage regulator to the first power rail through the first diode; and
applying the voltage output of the second voltage regulator to the first power rail through the second diode.

17. The method of claim 10, further comprising turning on and off the second voltage regulator to maintain the respective desired voltage levels for the plurality of circuit modules.

18. The method of claim 10, wherein:
the integrated circuit further comprises a pin operatively coupled to the voltage meters; and
the method further comprises routing the voltage levels measured by the voltage meters to the pin to enable external sampling of the voltage levels received by the circuit modules from the first power rail.

19. An integrated circuit, comprising:
first and second power rails;
a first voltage regulator coupled to electrically bias the first power rail with respect to the second power rail;
a plurality of circuit modules, each coupled between the first and second power rails to draw power therefrom;
a plurality of voltage meters, each coupled to measure a voltage level received from the first power rail by a respective one of the circuit modules, wherein a voltage output of the first voltage regulator applied to the first power rail is controlled based on the voltage levels measured by the voltage meters so that each of circuit modules receives a respective desired voltage level from the first power rail; and
a power manager operatively coupled to the first voltage regulator and to the two or more voltage meters, wherein the power manager is adapted to:
receive voltage-level measurements from the two or more voltage meters; and
control the voltage output of the first voltage regulator based on the voltage-level measurements, wherein the voltage-level measurements are received in digital form over a digital bus.

20. A method of supplying power to an integrated circuit, the method comprising:
electrically biasing a first power rail of the integrated circuit with respect to a second power rail of the integrated circuit using a first voltage regulator, wherein the integrated circuit comprises a plurality of circuit modules, each coupled between the first and second power rails to draw power therefrom;

for each of the circuit modules, measuring a voltage level received by the circuit module from the first power rail; and controlling a voltage output of the first voltage regulator applied to the first power rail based on the measured voltage levels so that each of the circuit modules receives a respective desired voltage level from the first power rail, wherein:

the integrated circuit further comprises a power manager operatively coupled to the first voltage regulator and to the two or more voltage meters;

the power manager is adapted to:
  receive voltage-level measurements from the two or more voltage meters; and
  control the voltage output of the first voltage regulator based on the voltage-level measurements; and the voltage-level measurements are received in digital form over a digital bus.

* * * * *

UNITED STATES PATENT AND TRADEMARK OFFICE
CERTIFICATE OF CORRECTION

PATENT NO. : 7,642,672 B2 Page 1 of 1
APPLICATION NO. : 10/816877
DATED : January 5, 2010
INVENTOR(S) : Steven E. Strauss It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this

Twenty-first Day of December, 2010

David J. Kappos
*Director of the United States Patent and Trademark Office*